United States Patent
Thalmayr

(10) Patent No.: US 6,234,723 B1
(45) Date of Patent: May 22, 2001

(54) CONVEYING CAPSULE FOR A PNEUMATIC TUBE CONVEYOR SYSTEM

(76) Inventor: Hermann Thalmayr, Hangstrasse 10, A-5102 Anthering (AT)

( * ) Notice: Subject to any disclaimer, the term of this patent is extended or adjusted under 35 U.S.C. 154(b) by 0 days.

(21) Appl. No.: 09/248,451

(22) Filed: Feb. 11, 1999

(30) Foreign Application Priority Data

Apr. 3, 1998 (AT) .......................................... 578/98

(51) Int. Cl.$^7$ ................................................. B65G 51/06
(52) U.S. Cl. ........................ 406/188; 292/113; 406/184; 406/187; 220/219
(58) Field of Search ..................... 406/184, 186, 406/187, 188; 215/230, 231, 284, 274, 275; 220/219, 220, 221; 292/113

(56) References Cited

U.S. PATENT DOCUMENTS

| | | | |
|---|---|---|---|
| Re. 30,882 | * 3/1982 | Leavelle | 406/186 |
| 363,769 | * 5/1887 | Rylands | 215/284 |
| D. 376,958 | * 12/1996 | Blanc | 215/284 |
| 757,848 | * 4/1904 | Steidl . | |
| 1,298,128 | * 3/1919 | White | 215/284 |
| 1,330,966 | * 2/1920 | White | 215/284 |
| 1,381,855 | * 6/1921 | Ashcraft . | |
| 1,773,693 | * 8/1930 | Stirrup . | |
| 2,690,921 | * 10/1954 | Braun . | |
| 3,259,412 | * 7/1966 | Wheeler . | |
| 3,347,578 | * 10/1967 | Sheehan . | |
| 3,655,146 | * 4/1972 | Woll | 406/188 |
| 3,902,226 | * 9/1975 | Messenbaugh | 240/70 K |
| 4,149,685 | * 4/1979 | Leavelle | 406/186 |
| 4,919,288 | * 4/1990 | Monti | 215/284 |
| 4,948,303 | * 8/1990 | Good | 406/186 |
| 5,551,174 | * 9/1996 | Perrissoud | 36/50.5 |
| 5,655,677 | * 8/1997 | Fratello et al. | 220/4.22 |
| 5,871,308 | * 2/1999 | Valerino, Sr. et al. | 406/186 |
| 5,980,164 | * 11/1999 | Fratello | 406/190 |

\* cited by examiner

*Primary Examiner*—Christopher P. Ellis
*Assistant Examiner*—Richard Ridley
(74) *Attorney, Agent, or Firm*—Herbert L. Lerner; Laurence A. Greenberg; Werner H. Stemer

(57) ABSTRACT

A conveying capsule for a pneumatic tube conveyor system is formed with a capsule body the open end face of which is closed with a lid. The lid is hinged on the capsule body about a transverse pin, and it has a lid closure on the side of its peripheral wall opposite from the hinge pin. The closure is formed with a closure hook that engages into a latching cutout formed in the capsule body. An actuating lever for the closure hook is articulated in a wall recess on the outside of the peripheral wall and the inward-pointing closure hook engages into the latching cutout which is open towards the outside. An annular seal is disposed between the lid and the capsule body. The seal is inserted into an annular groove formed in the end face of the peripheral wall of the lid or of the capsule body.

6 Claims, 3 Drawing Sheets

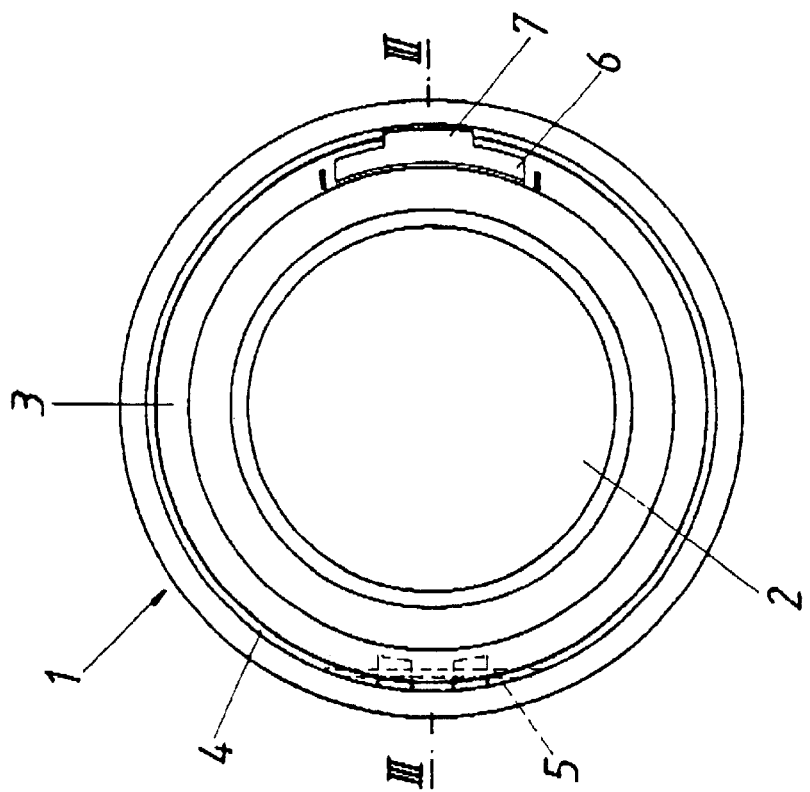
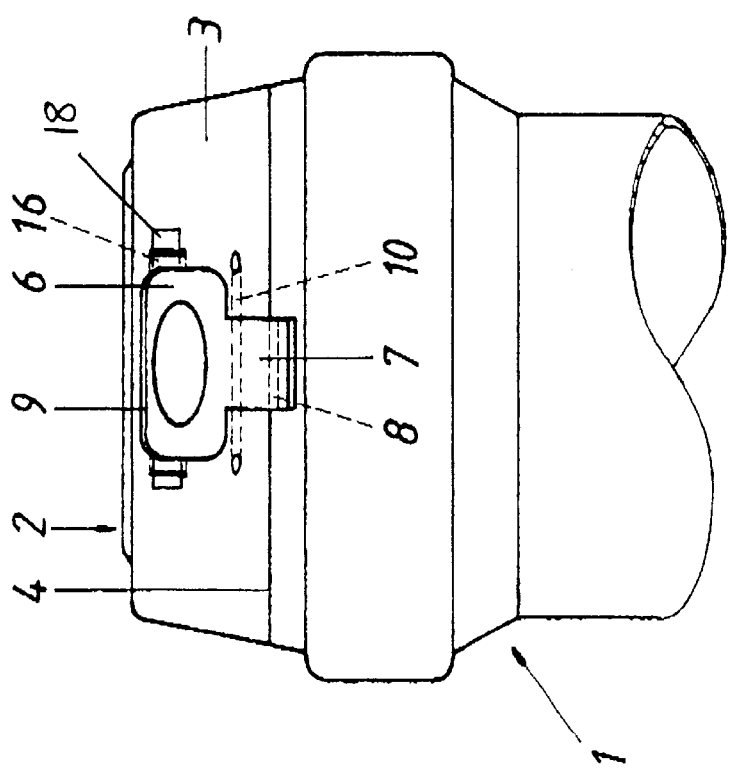

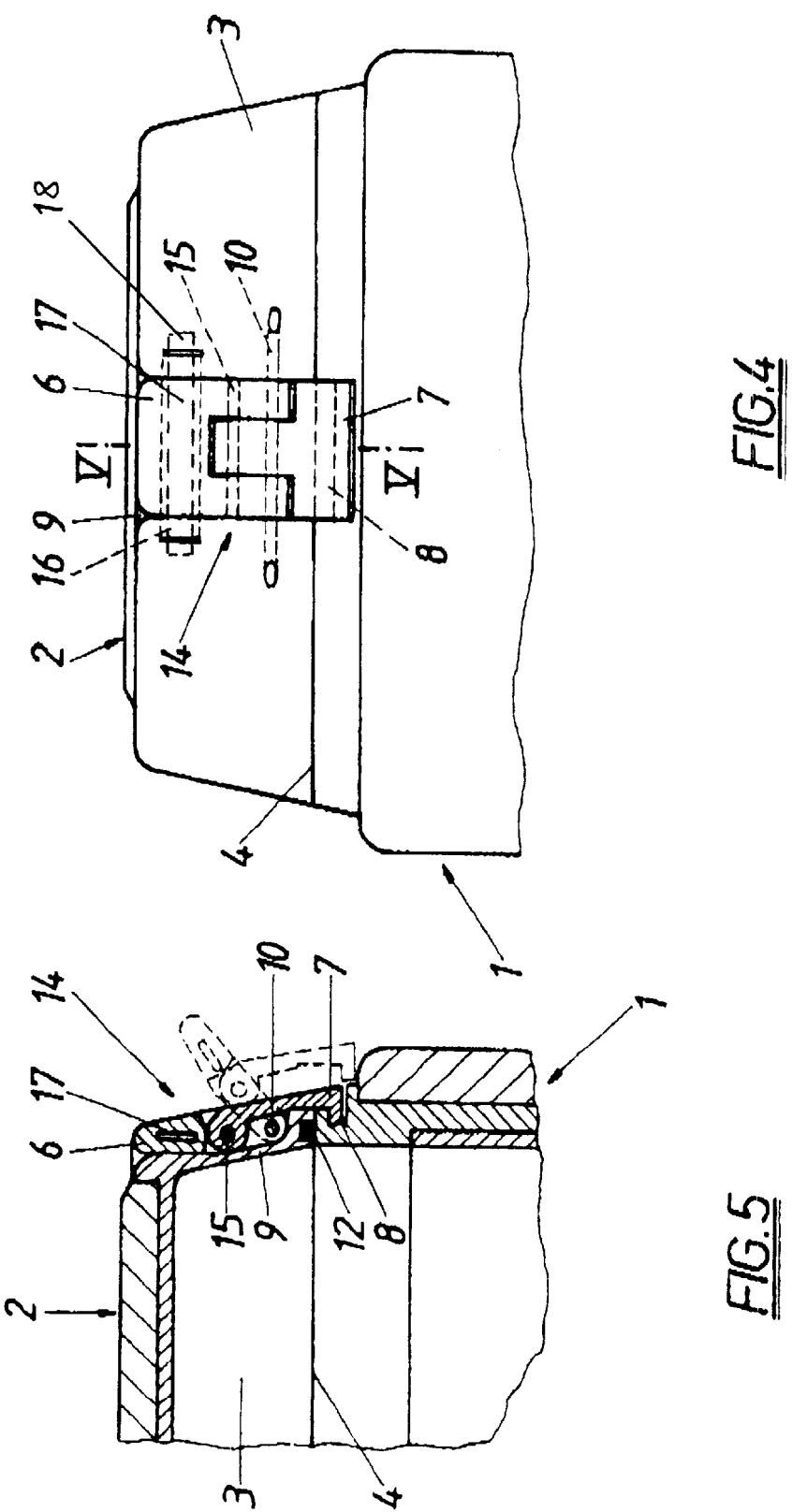

CONVEYING CAPSULE FOR A PNEUMATIC TUBE CONVEYOR SYSTEM

BACKGROUND OF THE INVENTION

1. Field of the Invention

The invention relates to a conveying capsule for a pneumatic tube conveyor system. The capsule has a capsule body which is open at one end face and a lid is hinged on the capsule body about a transverse pin. The lid has a closure on the side of its peripheral wall opposite from the hinge pin which bears a closure hook engaging into a latching cutout in the capsule body.

2. Description of the Related Art

Prior art conveying capsules of that type are described in Austrian Patent AT 403 032 B. They offer the advantage, as compared with the conventional pneumatic post capsules having a lid that can be pivoted open about a pin parallel to the axis, that after the lid has been swung down, the aperture on the end face of the capsule body is fully exposed and is not overlapped by a peripheral wall extending over half the periphery and forming a conical capsule head together with the peripheral wall of the lid, which likewise extends over half the periphery. Furthermore, handling is facilitated, since the lid closure can be opened and the lid swung down with one hand. The lid closure is formed by an outward-facing closure hook which engages from the interior of the capsule into a latching cutout in the capsule body, in the manner of a snap closure. To open the closure, therefore, it is merely necessary for the tongue forming the closure hook, produced by slits in the edges of the peripheral wall of the lid, to be pivoted inward against the force of its own resilience in order to press the closure hook out of its latching cutout. Because of the tongue which is to be pivoted inward toward the peripheral wall of the lid, however, such a conveying capsule cannot be closed in a liquid-tight manner, so that such conveying capsules are not suitable for the conveying of, for example, liquid samples, although the swing-up lid offers advantages with regard to the insertion and removal of such samples.

Conveying capsules that can be liquid-tightly closed have become known, heretofore, from Austrian Patent AT 394 179 B. There, the lid is removable from the capsule body and can be locked on the body by a bayonet closure. An O-ring is placed in an annular groove at the face end so that, when the bayonet closure is clamped, the O-ring is correspondingly compressed between the lid and the capsule body. The liquid-tight connection and the functional liquid-tightness in that prior art system depends on the presence of the bayonet closure.

SUMMARY OF THE INVENTION

It is accordingly an object of the invention to provide a conveying capsule for a pneumatic tube conveyor system, which overcomes the above-mentioned disadvantages of the heretoforeknown devices and methods of this general type and which provides for a liquid-tight connection between a swing-up lid and the capsule body.

With the foregoing and other objects in view there is provided, in accordance with the invention, a conveying capsule for a pneumatic tube conveyor system, comprising:

a capsule body formed with an open end face and a latching cutout in a vicinity of the open end face;

a lid pivotally hinged on the capsule body about a transverse pivot axis relative to the capsule body, the lid having a peripheral wall;

a closure disposed on the peripheral wall opposite from the pivot axis, the closure including an actuating lever and an inwardly pointing closure hook connected to the actuating lever, the closure hook engaging into the latching cutout of the capsule body when the lid closes the end face of the capsule body;

the peripheral wall having a wall recess formed therein and the actuating lever being pivotally mounted in the wall recess; and an annular seal disposed between the lid and the capsule body, the annular seal being inserted in an annular groove formed in one of the capsule body and the lid.

In accordance with an added feature of the invention, the lid is formed with an end face abutting the open end of the capsule body when the conveying capsule is closed, and wherein the annular groove is formed in the end face of the lid and the annular seal is an O-ring.

In other words, the objects of the invention are satisfied in that the actuating lever for the closure hook is pivotally mounted in a wall recess on the outside of the peripheral wall, the inward-pointing closure hook engages into the latching cutout which is open on the outside, and, between the lid and the capsule body, an annular seal is provided which is inserted into an annular groove on the end face of the peripheral wall of the lid or of the capsule body.

As a result of providing an actuating lever separate from the peripheral wall of the lid and its transfer to the outside of the peripheral wall of the lid, a continuous peripheral wall of the lid, an essential precondition for a liquid-tight closure of the capsule body, is made possible, the closure, in its closed position, not projecting above the outline shape of the lid as a result of the arrangement of the actuating lever in a wall recess of the peripheral wall. The closure hook borne by the actuating lever, which closure hook must extend with the actuating lever on the outside of the conveying capsule, can thus engage only by means of an inward-directed hook into a latching cutout of the capsule body which is open on the outside. Since the closure hook pulls the lid in an axial direction toward the capsule body, particularly advantageous sealing conditions are achieved for the annular seal provided between the lid and the capsule body, so that, with the lid which can be swung down about a transverse pin, a conveying capsule is obtained which conforms to all requirements in respect of handling and tightness. The annular seal can be inserted into an annular groove at the end either of the peripheral wall of the lid or of the capsule body. Since this annular seal interacts with a continuous annular surface of the respective other structural part, tightness in the region of the abutment surface between lid and capsule body is guaranteed irrespective of the arrangement of the annular groove.

In accordance with an additional feature of the invention, the actuating lever is a two-armed lever spring-biased towards a locking position, and wherein the closure hook is formed on an arm of the two-armed lever projecting toward the capsule body. The actuating lever, transferred to the outside, allows various designs of closure. In the case of the two-armed lever, when the actuating lever is pivoted toward the peripheral wall of the lid, the closure hook is pivoted out of the latching cutout in the capsule body and the closure is thus opened. In order to close this closure, the lid merely has to be swung toward the capsule body until the closure hook engages in the latching cutout in the manner of a snap closure. In this latching position, the annular seal is clamped under prestress between the lid and the capsule body.

In accordance with another feature of the invention, the actuating lever is a tension lever pivotally supported about a pivot axis, the closure hook formed on the actuating lever at a distance from the axis of rotation thereof forming a closure lever of a tension lever closure. By actuation of the tension lever in the direction of closure, the closure lever is thus pulled axially toward the lid together with the closure hook engaging into the latching cutout, whereby an additional axial tensioning force for the annular seal can be achieved.

In accordance with again another feature of the invention, the peripheral wall of the lid is formed with a plug-in aperture for receiving a plug-in securing device for securing the actuating lever, the plug-in aperture being interrupted by the wall recess formed in the peripheral wall.

In accordance with a concomitant feature of the invention, the actuating lever has a passage aperture formed therein, and the plug-in aperture extends in the passage aperture.

The fact that the actuating lever is transferred to the outside of the peripheral wall of the lid permits an additional securing of the closure in order reliably to exclude unintentional opening of the closure. The plug-in aperture may receive a plug-in securing device for the actuating lever. If this plug-in securing device is introduced into the plug-in aperture of the peripheral wall provided for this purpose, it blocks a pivoting movement of the actuating lever. The plug-in securing device can merely rest against the actuating lever in order to prevent its pivoting movement in the opening direction. It is however also possible to have the plug-in securing device engaged into a corresponding passage aperture in the actuating lever.

Other features which are considered as characteristic for the invention are set forth in the appended claims.

Although the invention is illustrated and described herein as embodied in conveying capsule for a pneumatic tube conveyor system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a partial elevational view of a conveying capsule according to the invention for a pneumatic tube conveyor system showing the upper end of the tube and the lid on the closure side;

FIG. 2 is a top plan view of the conveying capsule;

FIG. 4 is an enlarged partial elevational view similar to that of FIG. 1, of an alternative embodiment of the conveying capsule according to the invention; and FIG. 5 is a partial sectional view of the closure of the conveying capsule taken along the line V—V in FIG. 4.

DESCRIPTION OF THE DRAWINGS

Figure 3:
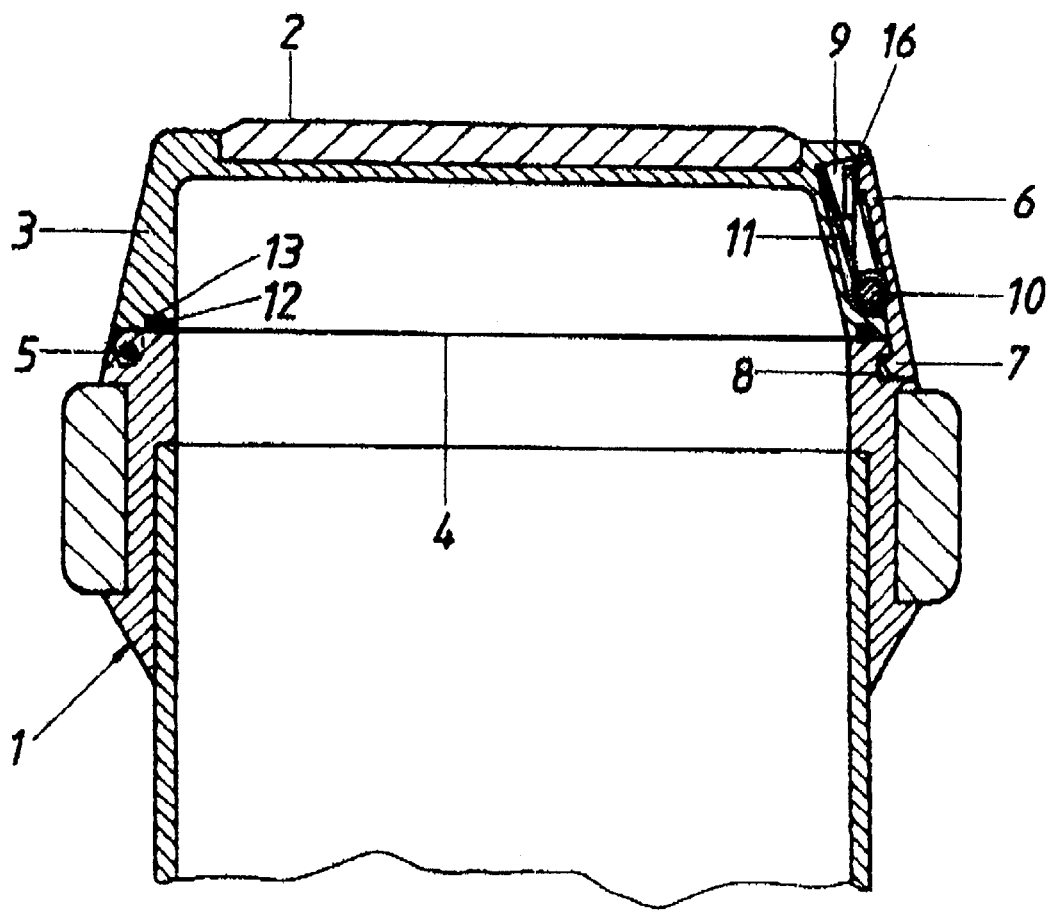
FIG. 3 is an axial section taken along the line III—III in FIG. 2 on a larger scale.

Referring now to the figures of the drawing in detail and first, particularly, to FIG. 1 thereof, there is seen a conveying capsule (also referred to as a conveying case, a pneumatic traveler, or a pneumatic dispatch container in the art) with a capsule body 1 which is open at the end face and a lid 2 closing the open end face of the capsule body 1. A peripherally continuous, conical peripheral wall 3 of the lid together with the capsule body 1 forms an abutment surface 4 normal to the axis of the tubular body. A hinge pin 5 (see FIG. 2) by which the lid 2 is articulated at the capsule body 1 extends parallel to the abutment surface 4 in the region of the capsule body 1 and is oriented tangentially thereto. Opposite the hinge pin 5, the lid 2 has a closure consisting of an actuating lever 6 and a closure hook 7. The closure hook 7 is directed inward and engages into a latching cutout 8 of the capsule body 1 which is open on the outside.

In the exemplary embodiment of FIGS. 1 to 3, the closure hook 7 is designed integrally with the actuating lever 6. The lever 6 is pivotally mounted as a two-armed lever in a wall recess 9 in the peripheral wall 3 of the lid 2. The pivot mount is effected by a pivot pin 10. The pivot pin 10 receives a closure spring 11 which is supported at one end on the wall recess 9 of the lid 2 and at the other end on the actuating lever 6, so that a closing force is exerted on the actuating lever 6 by the closure spring 11. If the lid 2 is swung toward the capsule body 1 about the hinge pin 5, the closure hook 7 snaps into the latching cutout 8 similar to a snap closure and holds the lid 2 firmly in the closure position relative to the capsule body 1. When this occurs, an annular seal 12—preferably an O-ring—provided in the abutment surface 4 between the lid 2 and the capsule body 1 and continuous in itself is subjected to pressure between the lid 2 and the capsule body 1. The annular seal 12 ensures a liquid-tight lid closure. In the exemplary embodiment, the annular seal 12 is inserted into an annular groove 13 formed in the end face of the lid 2. The annular groove 13 could, however, also be assigned to the end face of the capsule body 1. In order to open the lid 2, the actuating lever 6 merely needs to be pivoted into the wall recess 9 against the force of the closure spring 11 in order to pivot the closure hook 7 out of the latching cutout 8, whereby the lid 2 is released and can be folded up about the hinge pin 5.

Referring now to FIGS. 4 and 5, the difference between the exemplary embodiment shown therein and the exemplary embodiment of FIGS. 1 to 3 resides in the configuration design of the lid closure which, here, is a double-lever system. The lid closure of the conveying capsule according to FIGS. 4 and 5 is, in fact, formed by a tension lever closure 14 whose tension lever is formed by the actuating lever 6, while the closure hook 7 serves as a closure lever. The closure lever is hinged on the actuating lever 6 at a distance from the pivot axis 10 thereof. The hinge pin of the closure hook 7 on the actuating lever 6 is designated with the reference numeral 15. If the actuating lever 6 is pivoted out of the closure position, shown in solid lines in FIG. 5, into the open position, shown with broken lines, the closure hook 7 emerges from the latching cutout 8 of the capsule body 1. When the actuating lever 6 is closed, the closure hook 7 engages into the latching cutout 8. The lid 2 is thereby pressed against the capsule body 1 when the tension lever closure 14 is tensioned. This leads to the advantageous pressure load on the annular seal 12.

In its closed position, the tension lever closure 14 forms, in a conventional manner, an over-center helper position which prevents the unassisted opening of the tension lever closure 14. In order to achieve additional security of the closure, for example as a consequence of an impact stress on the lid 2, a plug-in aperture 16, interrupted by the wall recess 9, may be provided in the peripheral wall 3 of the lid 2, continuing according to the exemplary embodiment in FIGS. 4 and 5 in a passage aperture 17 of the actuating lever 6. If a plug-in securing device 18 is introduced into the plug-in aperture 16, this plug-in securing device 18 passes through the actuating lever 6 in the passage aperture 7. The actuating lever 6 is thus secured against pivoting relative to the lid 2.

Similarly, the peripheral wall 3 of the lid 2 according to the exemplary embodiment in FIGS. 1 to 3 is provided with a plug-in aperture 16, though this extends past the actuating lever 6, as can be seen from FIG. 3. If a plug-in safety or securing device 18 is introduced into the plug-in aperture 16, the plug-in securing device 18 rests against the actuating lever 6, behind the latter, which is thus likewise locked against a pivoting movement.

I claim:

1. A conveying capsule for a pneumatic tube conveyor system, comprising:

a capsule body formed with an open end face and a latching cutout in a vicinity of said open end face;

a lid pivotally hinged on said capsule body about a transverse pivot axis relative to said capsule body, said lid having a peripheral wall with a wall recess formed therein;

a closure disposed on said peripheral wall opposite from said pivot axis, said closure including an actuating lever pivotally mounted in said wall recess and a closure lever pivotally mounted on said actuating lever and formed with an inwardly pointing closure hook, said closure hook engaging into said latching cutout of said capsule body when said end face, of said capsule body, is closed and said actuating lever is pivoted into said wall recess formed in said peripheral wall; and an annular seal disposed between said lid and said capsule body, said annular seal being inserted in an annular groove formed in one of said capsule body and said lid.

2. The conveying capsule according to claim 1, wherein said lid is formed with an end face abutting said open end of said capsule body when the conveying capsule is closed, and wherein said annular groove is formed in said end face of said lid and said annular seal is an O-ring.

3. The conveying capsule according to claim 1, wherein said actuating lever is a two-armed lever spring-biased towards a locking position, and wherein said closure hook is formed on an arm of said two-armed lever projecting toward said capsule body.

4. The conveying capsule according to claim 1, wherein said actuating lever is a tension lever pivotally supported about a pivot axis, said closure hook formed on said actuating lever at a distance from the axis of rotation thereof forming a closure lever of a tension lever closure.

5. The conveying capsule according to claim 1, wherein said peripheral wall of said lid is formed with a plug-in aperture for receiving a plug-in securing device for securing said actuating lever, said plug-in aperture being interrupted by said wall recess formed in said peripheral wall.

6. The conveying capsule according to claim 5, wherein said actuating lever has a passage aperture formed therein, and said plug-in aperture extends in said passage aperture.

* * * * *